United States Patent
Smith

(10) Patent No.: US 6,298,889 B1
(45) Date of Patent: Oct. 9, 2001

(54) SINGLE COLOR VEHICLE TIRES OF FULLY COLORED COMPOSITION

(76) Inventor: Krag Smith, Gaithersburg, MD (US)

(*) Notice: Subject to any disclaimer, the term of this patent is extended or adjusted under 35 U.S.C. 154(b) by 0 days.

(21) Appl. No.: 09/315,958

(22) Filed: May 21, 1999

(51) Int. Cl.$^7$ ................. B60C 1/00; B60C 19/00
(52) U.S. Cl. .................. 152/151; 152/209.1; 152/209.5; 152/450; 152/524
(58) Field of Search ................ 152/450, 209.5, 152/524, 151, 452, 209.1; 264/326

(56) References Cited

U.S. PATENT DOCUMENTS 3,768,537 * 10/1973 Hess et al. .................. 152/209.4

FOREIGN PATENT DOCUMENTS 62-68101 * 3/1987 (JP) ...................... 152/151
2-189207 * 7/1990 (JP) ...................... 152/450
4-202339 * 7/1992 (JP) ...................... 152/209.4

OTHER PUBLICATIONS

Bike Nashbar catalog 107 pp. 48 and 49, 1995.*

* cited by examiner

*Primary Examiner*—Adrienne C. Johnstone
(74) *Attorney, Agent, or Firm*—John P. Halvonik

(57) ABSTRACT

The invention is a process of manufacture, namely an automobile tire that is made of a colored composition that is of a single, inherent non-black color. The rubber composition of the tire is thus enhanced by the use of a coloring agent such as a pigment or dye that will yield a desired color upon completion of the tire manufacturing process. Such dye or pigment may be enhanced by the use of reflective, luminescent or photochromic agents that will enhance certain effects and appearances of the tire including: ease of visibility, other safety concerns including wear and puncture identification, and aesthetic appearance.

4 Claims, No Drawings

SINGLE COLOR VEHICLE TIRES OF FULLY COLORED COMPOSITION

FIELD OF THE INVENTION

The invention relates to the field of powered vehicles and tires for such. In particular, the invention relates to an article of manufacture and the process for manufacturing such tires having a distinct, non black, color. Such color may be based on a dye or pigment and should be dispersed solidly and evenly through the rubber composition of the tire so that the non black color will remain inherent through all portions of the tire.

BACKGROUND AND PRIOR ART

While there are tires that are not completely black, such tires are found with colored sidewalls and/or appliqués, there are no known tires that are manufactured with a single solidly dispersed color in them that is not black. Nowadays black tires in use on essentially all vehicles are of one single color, namely black. Appliqués and sidewalls are in contrast to the black material of the tire and as such really only amount to a colored coating on the outer wall surface of the tire. The invention described herein includes dyes or pigments used directly in the tire composition and dispersed throughout the tire.

It is thought that the use of tires that are colored with a color other than black will lead to advantages not yet seen in the field of vehicle tires. For instance, such tires would be better able to show signs of wear because such signs of wear will become more easily evident in a tire that is of a color lighter than black. Damage marks that develop over the life of a tire will frequently show signs of the type of damage that was done to the tire during the wearing out of the tire. Such scuffs and other damage will show up much more clearly when the background color of the tire is other than black.

In such cases, dirt and oils from the road will be picked up by the damage in the tire and will contrast starkly with the color of the non black tire. By tracking such damage, a mechanic may be better able to determine what maintenance steps are needed for that tire. In addition, the need for and the proper direction of tire rotations can be better determined by the mechanic or other maintenance person who can see signs of tire wear by inspecting the wear patterns on the colored tire.

Moreover, tire wear that shows up clearly can be used to spot punctures that have occurred and may be used to spot potential trouble areas such as a tire bulge or cracking that might soon prove to be dangerous or, for example, a weak spot that is developing in the tire. The use of a non black color, for example red, that is dispersed entirely throughout the tire composition will thus produce fresh red scuffs or streaks or similar signs of damages and wear. This is in contrast to the oily black color that may develop over the worn flat portions of the tread that are constantly in contact with the oily surface of the roads. Such fresh marks of a non black color would underscore newly developed cracks or other disturbance of the tires and would be more easily seen as they are of a lighter-than-black color.

Aside from tire maintenance, other types of vehicle maintenance may also be indicated by studying the wear patterns on non black tires. For instance, a tire having too much wear on the inside of the tire may mean that the tires and wheels need to be balanced or that the wheels are out of alignment.

It is also believed that using tires that are of a solid non black color will provide a greater degree of safety for both pedestrians and passengers/drivers of vehicles. Such tires will highlight the appearance of a vehicle at night as well as provide a better visual picture of the vehicle during the day. Such colored tires may include coloring agents and other compositions that provide reflectance and will produce a greater reflectance than the standard black tires that are currently in use on vehicles. Such compositions may include reflective material in the dye or pigment and/or the use of reflective materials in the tire in addition to the dye or pigment.

Such colored tires could be operating in connection with the small amount of light that is present from street lights and the other sources of light during the night so that a lighter than black color of the tire surface will provide a visual warning at night that can seen by motorists, pedestrians and/or animals. Such visual appearance may be enhanced by the use of reflective materials in the pigments and/or other coloring agents used in the tire composition.

In addition, the aesthetic beauty of a tire may enhance the visual appearance of the vehicle upon which it is used. It is thought possible that such colored tires will provide such a striking appearance for the vehicle that such tires may be used at trade shows or other automotive displays where the color of the tires will draw attention first to the tires and then to the vehicle itself.

It is believed that there are benefits to making tires of a composition that is of color other than black and such benefits and advantages that would accrue will be recognized by those skilled in the art, once the invention is shown and described.

SUMMARY OF THE INVENTION

The invention is a vehicle tire that is of a single non black color that is more distinct and visually striking than the state of the art black color that is in use nowadays. Such tire compositions that are in use may be enhanced by coloring agents such as dyes and pigments that will be dispersed throughout the rubber composition and will serve to color the tire a distinctive, non black, color that remains throughout the tire. Such pigments and/or coloring agents may include reflective materials to enhance the visual appearance of such tire at night. Colors such as reds, blues, greens, yellows, browns as well as lighter shades and more earthy tones may be produced by the different types and combinations of the dyes and pigments.

The visual effect of such compositions may be enhanced by the use of components that provide luminescent, reflective and/or photochromic properties to the tire material in question. Such pigments, and dyes may be chosen from state of the art materials. The invention also includes a method for manufacturing such tires as well as the colored tires.

It is among the objectives to provide a tire of a composition having a non black color that is solidly and evenly dispersed throughout the density of the tire composition so that the tire will remain with a non black appearance even as the tire is worn or damaged.

It is among the objectives to provide a tire that is of a color other than black and having a striking visual appearance that will alert motorists and pedestrians that a moving vehicle is in the area.

It is among the objectives to provide a tire having a dye or pigment in the rubber composition that produces non black signs of wear on the tire that will provide a greater visual indication of signs of wear and damage to the tire.

It is among the objectives to provide a tire that is of a color other than black and will have a visual appearance that is readily apparent at night so as to provide a greater visual warning to motorists and pedestrians that a vehicle is approaching.

Another objective is to provide a non black color and appearance that will enhance the aesthetic appeal of a vehicle by drawing attention to the tires of a vehicle that would otherwise be of an ordinary state of the art black color.

Other objectives will be apparent once the invention is shown and described.

DESCRIPTION OF THE PREFERRED EMBODIMENT

The process described may be used on any state of the art compositions that may be used for tire compositions including both natural rubber and synthetic rubber. The tires of the present invention may be manufactured by any state of the art commercial process that will produce tires that are suitable for modern day use on modern day vehicles and will result in tires that are of non black color. Such process may include heat treatment of the tire material as well as a curing process to produce synthetic rubber.

To the manufacturing process of the tire is added a dye or pigment or other coloring agent so as to produce a rubber or synthetic rubber composition suitable for tires that has a non black color evenly dispersed throughout the tire composition. By "fully colored" it is meant that the tire composition itself is of a non black color and this color remains throughout the density of the tire so that the color is an inherent ingredient the composition.

The resulting tire will be of a non black color that is distinctive from the modern day, state of the art black colored tires. Such color should stand out in appearance. It is thought that colors such as reds or blues will provide a good aesthetic effect and may provide a striking appearance. Woodland hues such as greens, browns and yellows may be used for a less obtrusive and more natural looking appearance to the tire and the vehicle.

Lighter shades such as grays, whites, and off whites may also be used to provide a cleaner look and may be more easy to see in the dark and to spot signs of damage to the tire. The aforementioned list of colors is not meant to be exhaustive but merely illustrative of the types of colors and the resulting effects that may be produced by the use of such colors.

It is believed that many types of commercial rubber compositions may be suitable for practicing the invention. Such types of rubber may include commercial polymer and pre-polymers that form vulcanizable rubber products as well as natural rubbers. Natural rubber products may also be used in the tire manufacturing process. To these rubber pre polymers and natural rubbers may be added a pigment or dye such that the coloring agent will produce a non black color when the finished product is created.

For instance, certain types of titanium dioxides will produce white color and these types of coloring agents may be added to the polymerizable compositions when the polymer of the tire composition is formed. Metallic based oxides as well as cyano dyes, or di-aryl based dyes or other types of dyes may be used. Other types of colors may be used without violating the spirit of the invention. Other state of the art ingredients that may be used in the tire manufacturing process include stabilizers, fillers, cross linking agents, catalysts, sealants, preservatives and other ingredients that are recognized in the art as suitable for use in manufacturing tires.

The types of metallic particles that may be used in the coloring process may be of any size or shape that is found to be suitable for the purposes of vehicle usage and after due allowance is made for trial and error in the design and development process. Such metallic particles may include oxides of metals and/or metal alloys of elemental metals. Some types of oxides that may be of use in the invention include titanium dioxide and zinc oxides. Other dyes and pigments may be used without varying from the spirit of the invention.

Tires with a lighter pigmented body may absorb a reduced amount of ultraviolet light rays and light from other parts of the spectrum and this, in turn, will lower the amount of energy that is absorbed and thus, the rate of rubber degradation in the tire is slowed by increasing the light reflectance of the tire. Such degradation may occur due to long exposure to the elements and is more likely to occur when the tire is not actually in use on the wheel as rotation of the tire gives effect to the blooming process for tire protection.

Additional additives may be used in lieu of, or in combination with, state of the art carbon black compositions to absorb and/or dissipate the ultraviolet energy. Such dissipation would be in addition to that provided by the use of the lighter inherent colors of the novel tires. A silica based process may also be used in place of the carbon black process and other methods referred to above.

Ultraviolet ray absorption may also be combated with reflective materials and additives in the tire composition proper or on the surface of the tire, thus reducing the level of ultraviolet ray penetration and resulting damage. Standard methods used in the commercial field may be still be used to enhance the dissipation of absorbed energy in the tire. The use of the ligher colored tires should not preclude these processes. Other methods of transferring heat from the tire may be used without violating the spirit of the invention.

One such method would be a sacrificial protectant process, such as blooming, that may be utilized to protect the surface of the tire. Such blooming results in ozone protection of the tire. Other methods that achieve the same effect on the tire surface may also be practiced with the invention.

It is preferred that the pigment or coloring agent used in the manufacturing process should be dispersed in a continuous and even manner throughout the tire material. That is the lighter colored agent is not merely a coating or an appliqué but rather it is fully dispersed throughout the density of the tire and as such the tire will not change in color when a cut or other damage occurs to the surface of the tire. In other words, the tire is not surface coated by the pigment or dye, such non black color remains throughout the depth of the tire. It will be red, or whatever color is used, through the whole tire.

Such coloring agents may be enhanced by the use of reflective materials as an option, that will reflect some portions of ambient light and so brighten the appearance of the tires at night. Such reflective materials may be the same or in addition to the coloring agents used to produce the non black color. Such reflective materials may be specially formulated for use in the nighttime when ambient light is at a minimum or for daylight hours when the light is at a maximum. Such materials may include metallic and/or plastic agents that reflect light.

Other optional embodiments include optional pigments that may enhance the visual effect of tires at night. Such options may include the use of photo chromic or photo luminescent type of dyes and/or pigments. Such photoluminescent type pigments may allow for a glow in the dark effect of the tires at night. Such materials are widely used in other type of applications today and may be adapted for use in vehicle tires. Such materials may absorb energy from light during the daylight hours and then return the energy in the form of luminescence at night. The visual effect may be quite striking when used on a vehicle and may serve as an additional warning to motorists and pedestrians that a vehicle is in the area.

The use of photochromic materials allows for color changes that take place due to change in temperature. Again such materials in a vehicle tire could enhance the visual effect of the tires on a day when the ambient temperature rises or falls. Such visual effect at night could increase the safety of automotive driving at night. Such photochromic materials can also provide visually appealing patterns that are characteristically complicated in appearance.

I claim:

1. A vehicle tire comprising: a rubber composition phase throughout the tire that consists of at least one non black coloring agent compound that is dispersed throughout said rubber composition phase, said at least one coloring agent chosen from the group consisting of titanium oxides, zinc oxides, cyano based dyes, di-aryl based dyes, and metal alloys.

2. The tire of claim 1 wherein said rubber composition phase includes a heat dissipating compound consisting of a silica based compound.

3. The tire of claim 2 wherein said rubber composition phase includes a sacrificial blooming agent.

4. The tire of claim 3 wherein said rubber composition phase includes a light reflecting material.

* * * * *